(12) United States Patent
Jung (10) Patent No.: US 8,975,312 B2
(45) Date of Patent: Mar. 10, 2015

(54) COLOR INDICATING EPOXY RESINS AND METHODS THEREOF

(75) Inventor: Adrian T. Jung, Kaarst (DE)

(73) Assignee: 3M Innovative Properties Company, St. Paul, MN (US)

( * ) Notice: Subject to any disclaimer, the term of this patent is extended or adjusted under 35 U.S.C. 154(b) by 141 days.

(21) Appl. No.: 13/704,810

(22) PCT Filed: Jun. 29, 2011

(86) PCT No.: PCT/US2011/042315
§ 371 (c)(1),
(2), (4) Date: Dec. 17, 2012

(87) PCT Pub. No.: WO2012/003204
PCT Pub. Date: Jan. 5, 2012

(65) Prior Publication Data
US 2013/0096234 A1    Apr. 18, 2013

Related U.S. Application Data (60) Provisional application No. 61/359,474, filed on Jun. 29, 2010.

(51) Int. Cl.
| | |
|---|---|
| C08K 5/13 | (2006.01) |
| C08K 5/18 | (2006.01) |
| C08K 5/37 | (2006.01) |
| C08K 5/42 | (2006.01) |
| C08L 63/00 | (2006.01) |
| C08J 3/24 | (2006.01) |
| C09J 163/00 | (2006.01) |
| C08K 5/23 | (2006.01) |
| C08K 5/46 | (2006.01) |
| C08K 5/47 | (2006.01) |
| C08G 59/50 | (2006.01) |
| C08G 59/54 | (2006.01) |

(52) U.S. Cl.
CPC .................. *C08L 63/00* (2013.01); *C08G 59/50* (2013.01); *C08J 3/248* (2013.01); *C09J 163/00* (2013.01); *C08K 5/23* (2013.01); *C08K 5/42* (2013.01); *C08K 5/46* (2013.01); *C08K 5/47* (2013.01); *C08J 2363/00* (2013.01); *C08J 2385/02* (2013.01)
USPC ........... 523/453; 523/455; 523/456; 523/461; 528/121; 528/122

(58) Field of Classification Search
None
See application file for complete search history.

(56) References Cited

U.S. PATENT DOCUMENTS

| | | |
|---|---|---|
| 3,030,329 A | 4/1962 | Warnsdorfer, Jr. |
| 3,366,600 A | 1/1968 | Haberlin |
| 3,773,706 A | 11/1973 | Dunn, Jr. |
| 4,160,064 A | 7/1979 | Nodiff |
| 5,425,824 A | 6/1995 | Marwick |
| 6,060,544 A * | 5/2000 | Keen .............................. 524/190 |
| 6,372,336 B1 | 4/2002 | Clausen et al. |
| 6,689,826 B2 | 2/2004 | Wojciak |
| 6,890,399 B2 | 5/2005 | Wojciak |
| 8,217,110 B2 | 7/2012 | Melancon et al. |
| 2007/0100081 A1 | 5/2007 | Suddaby |
| 2008/0075862 A1 | 3/2008 | Melancon et al. |
| 2010/0316875 A1* | 12/2010 | Lamon ......................... 428/413 |

FOREIGN PATENT DOCUMENTS

| | | | |
|---|---|---|---|
| EP | 438725 A | * | 7/1991 |
| GB | 927541 A | * | 5/1963 |
| GB | 960 276 | | 6/1964 |
| JP | 51-109999 A | * | 9/1976 |
| JP | H05-087798 | | 4/1993 |
| JP | 07-191013 | | 7/1995 |
| JP | H11-080637 | | 3/1999 |
| JP | 2000-026828 | | 1/2000 |
| JP | 2003-055536 | | 2/2003 |
| WO | WO 03/059999 A | * | 7/2003 |
| WO | WO 2005/030853 A1 | * | 4/2005 |

OTHER PUBLICATIONS

Akzo Nobel: "Awlgrip product data sheet standard 3 trowelable fairing", 2004, retrieved from the Internet: URL:http://www.awlgrip.com/Product%20Datasheets/3461+A+eng_A4.pdf [retried on Aug. 29, 2011].

Akzo Nobel: "Guidance Notes", Jan. 1, 2009, pp. 1-16, XP55005732, retrieved from the Internet: URL:http://www.awlgrip.com/support/safety/Documents/AGHandSGuidelinesFinalDoc.pdf [retrieved on Aug. 29, 2011].

* cited by examiner

*Primary Examiner* — Robert Sellers
(74) *Attorney, Agent, or Firm* — Julie Lapos-Kuchar (57) ABSTRACT

Described herein is an epoxy composition comprising: a first component comprising an amine-based curing agent and a first dye, having a first color; and a second component comprising a curable epoxy resin and a second dye, having a second color. Also described herein is a shelf-life-indicating composition comprising: an amine-based curing agent; and a dye selected from (i) a cationic triarylmethane dye, wherein the cationic triarylmethane dye reversibly reacts with a primary amine; (ii) a halochromic dye having a color transition range between 7-12 when measured in an aqueous solution; or (iii) combinations thereof.

17 Claims, 2 Drawing Sheets

COLOR INDICATING EPOXY RESINS AND METHODS THEREOF

TECHNICAL FIELD

A dye in at least the curing agent of an epoxy resin system is described. In one embodiment, a shelf-life indicating composition for an epoxy curing agent component is described comprising an amine-based curing agent and a dye. In another embodiment, a 2-component epoxy resin is described comprising a first component comprising an amine-based curing agent and a first dye; and a second component comprising a curable epoxy composition and a second dye.

BACKGROUND

Commercial two-component epoxy systems are packaged in a dual cartridge system, which dispenses an appropriate amount of curable epoxy resin and an epoxy curing agent. The dispensed curable epoxy resin and curing agent are then mixed to contact and react the curing agent with the curable epoxy resin, which then cures.

To obtain the maximum performance characteristics of the epoxy system, it is important that the curable epoxy resin and curing agent are adequately mixed and cured.

Because the colors and viscosities of the curable epoxy resin and the curing agent are often similar, it may be difficult to detect the completeness of mixing. Furthermore, after mixing, the epoxy system can be handled (e.g., poured and worked) until gelation occurs. Therefore, it is also useful to know when the epoxy system has sufficiently cured.

Traditionally, a single dye has been added to either the curable epoxy resin or the curing agent to indicate complete mixing and/or curing. For example, U.S. Pat. No. 3,773,706 (Dunn) describes adding phenosafranin dye to a curable epoxy system to indicate cure. Great Britain Pat. No. 927,541 describes adding a triphenylmethane or anthraquinone dye to the curable epoxy resin to indicate complete mixing based on the uniformity of color, which changes color again upon gelation. U.S. Pat. No. 4,160,064 (Hodiff et al.) describes adding a coloring agent to the curable epoxy resin to impart a latently transient color to assist in determination of complete mixing, which becomes essentially colorless upon the curing of the mixture.

SUMMARY

There is a desire to provide an improved 2-component epoxy resin system that would indicate to the user when multiple separate changes have occurred to the components of the epoxy resin system.

In one aspect, an epoxy composition is described comprising: a first component comprising an amine-based curing agent and a first dye, having a first color; and a second component comprising a curable epoxy resin and a second dye, having a second color.

In another aspect, a shelf-life indicating composition is described comprising: an amine-based curing agent; and a dye selected from (i) a cationic triarylmethane dye, wherein the cationic triarylmethane dye reversibly reacts with a primary amine; (ii) a halochromic dye having a color transition range between the pH of 7-12 when measured in an aqueous solution; or (iii) combinations thereof.

In yet another aspect, a method of indicating mixing and curing of a 2-component epoxy composition is described comprising: mixing a first component comprising an amine-based curing agent and a first dye and having a first color with a second component comprising a curable epoxy resin and a second dye and having a second color to form a third color and allowing the mixture to cure to form a fourth color, wherein each of the first, second, third, and four colors are visually different in color.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"a", "an", and "the" are used interchangeably and mean one or more;

"and/or" is used to indicate one or both stated cases may occur, for example A and/or B includes, (A and B) and (A or B); and "corresponding other component" refers to the other component of the 2-component epoxy system, for example if the discussion is related to the first component comprising the epoxy curing agent then the "corresponding other component" is the second component comprising the curable epoxy resin, and visa versa.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

The present disclosure is directed to a 2-component epoxy resin system comprising a color-indicating dye, which can act as a visual indicator to the user. For example, the visual indictor may be to distinguish between the first component and the second component or between a cured composition and the second component. The visual indicator may as be used to indicate to the user when changes have occurred in the product. For example, these changes may be related to the viability of the epoxy curing agent or monitoring the progression of the curing of the epoxy resin system to identify when the epoxy resin system has gelled.

Shelf-Life Indicating Composition

In one embodiment, the present disclosure is directed to a shelf-life indicating composition comprising an epoxy curing agent and a dye. Traditionally, in an epoxy resin system using an amine-based curing agent, the epoxy curing agent is clear and colorless or opaque and colorless or variations thereof. Because the curing agent is amine-based, and depending on the molecular weight of the amines, the amines may have a tendency to degrade upon exposure to the carbon dioxide and/or water in the air, creating a blushing appearance. This blushing appearance may be visually observed as skinning or the presence of crystalline solids. If the resulting decomposition products are soluble in the aging material, the blushing may be difficult to see. Therefore, it would be advantageous to have an epoxy curing agent, which would change color upon aging. The color change may indicate to the user that the epoxy curing agent may no longer be effective or viable for curing. Thus, the present disclosure provides for a shelf-life indicating composition for the epoxy curing agent comprising an amine-based epoxy curing agent and a dye.

Although not wanting to be limited by theory, it is believed that when primary amines in the epoxy curing agent are exposed to carbon dioxide, they degrade to form an ammonium carbamate, which may alter the pH of the epoxy curing agent. Therefore, the dyes useful in a shelf-life-indicating composition, include (i) those dyes that have a have a color transition range which overlaps with the pH changes of the epoxy curing agent as it degrades or (ii) those dyes that react reversibly with the primary amines in the epoxy curing agent.

A pH indicating dye (also referred to herein as a halochromic dye) is an acid or a base whose protonated species have different colors. Because the pH changes as the epoxy curing agent degrades, generally they becomes more acidic, a dye should be selected such that it has a color transition range around this same pH. Because the dyes are acidic or basic, more than one species of the dye (e.g., acid, conjugate acid, base, conjugate base) may be observed depending on the pH of the system. As known by the Henderson-Hasselbach equation, pH=pKa+log(conjugate base concentration/acid concentration), when the ratio of acid to conjugate base is equal, pH=pKa. Thus, an estimate of the pH transition range of the dye may be reasoned from its pKa. The closer the color change range of the dye (e.g., estimated by the pKa) to the pH change of the degraded epoxy curing agent, the more accurate the indicating of shelf-life will be.

In the embodiment related to a pH-indicating dye, one would select a dye, which has a color indicting range within the pH change of the epoxy curing agent (for example within at least 0.5 pH units, 1 pH unit, or even 2 pH units of the pH of the epoxy curing agent). For example, given an epoxy curing agent having a pH between 10 to 12 that is exposed to air, the primary amines in the epoxy curing agent react with carbon dioxide to form an ammonium carbamate, which acidifies and changes the pH of the degraded composition to perhaps, 8-10. Thus, one would select a halochromic dye which has a color transition range (i.e., changes color) between a pH of 7 to 9 when measured in an aqueous solution. If the pH of the epoxy curing agent is more or less basic, depending on the amines chosen and the composition of the curing agent, then the halochromic dye will be selected so that the dye's indicating range is within the correct pH range as described above. Halochromic dyes that may be used to indicate shelf-life of the epoxy curing agent include: Cresol Red, Thymol Blue, and Erichrome Black T.

In the embodiment related to the dye interacting with amines in the curing agent, the dye can be selected such that the dye reversibly reacts with a primary amine. In one embodiment, a dye that reversibly reacts with primary amines is selected by adding the dye to a test sample comprising primary amines and the color is noted. Typically the color observed is not that known for the dye and in one embodiment, the dye is colorless. Then carbon dioxide is added to the sample and the resulting color is noted. If the color of the initial test sample and final test sample are different, than the dye is said to have a reversible reaction with a primary amine. Dyes that reversibly react with primary amine may include cationic triarylmethane compounds, such as Patent Blue V.

In one embodiment, combinations of dyes may be added to the curing agent to indicate shelf life.

Four Color Change Composition

In another embodiment, the present disclosure is directed to a "speaking" epoxy system, wherein the user can tell based on observing the color of the composition, what composition they are looking at. For example, the user should preferably be able to distinguish the epoxy curing agent, the epoxy curable resin, the initially mixed components, and the cured mixture from each other. In this embodiment, a 2-component epoxy curing system comprises a first component comprising an epoxy curing agent and a first dye and a second component comprising a curable epoxy resin and a second dye.

In the present disclosure, the component comprising the curable epoxy resin is preferably a different color than the component comprising the epoxy curing agent. Upon mixing of the two components a third color is formed. This third color may be additive, (e.g., mixing yellow and blue yields green) or may not be additive (e.g., yellow and blue yields red). Upon, curing the mixture, a fourth color is formed. Advantageously, adding a different dye to both components of the epoxy resin allows the user to identify by sight what the composition is (for example, identifying the curing agent from the curable epoxy resin from the cured epoxy resin) and/or the extent of the curing reaction (for example, identifying when the curable epoxy resin has been sufficiently gelled and/or cured).

Although not wanting to be bound by theory, it is believed that there are at least three different selections of dye combinations that may be used to achieve the four different colors.

In one embodiment, the 2-component curable epoxy resin system comprises a cationic triarylmethane compound in at least one component, either the first component (i.e., the curing agent) or the second component (i.e., the curable epoxy resin). In this embodiment, the cationic triarylmethane compound has a reversible reaction with primary amines. The dye in the corresponding other component is not particularly limited. For example, the dye in the corresponding other component may also be a cationic triarylmethane dye, however, it will have a different chemical structure. In another example, a non-cationic triarylmethane dye may be added to the other component, and is not particularly limited in its color indicating range. For example one component (either the curing agent or the curable epoxy resin) comprises Patent Blue V and the other component comprises Cresol Red. It may be helpful for the user to select the dyes chosen in the first and second components such that they have different colors to enable, for example improved visual determination of components and/or enable distinction between the various color changes.

Although not wanting to be bound by conjecture, it is believed that the triarylmethane compound may react with a component in the epoxy curing agent either reversibly or irreversibly independent of pH.

In another embodiment, the 2-component curable epoxy resin system does not comprise a triarylmethane compound. In this embodiment, it is believed that at a minimum one of the components (either the curable epoxy resin or the curing agent) comprises a halochromic dye, which changes color as the mixed composition cures. In other words, the halochromic dye has a color change in the pH transition range of the mixed composition as it gels or cures. During curing, the primary amines in the curing agent react to form tertiary amines and the pH of the composite becomes less basic. In one embodiment, the halochromic dye has at least two pKas, meaning it will have two color change ranges. The dye in the corresponding other component is not particularly limited in its color indicating range, however the color of the dye in the corresponding other component should preferably be a different color to enable visual distinction between the various color changes. Such halochromic dyes include: Methyl Red, Methyl Orange, Cresol Red, Erichrome Black T, Thymol Blue, Bromothymol Blue, and other halochromic dyes as known in the art.

In one embodiment an amine-based curing agent comprising a first halochromic dye and having a first color transition range and a curable epoxy resin comprising a second halochromic dye and having a second color transition range may be used. An exemplary halochromic dye may include those that have a color transition range between 7 and 10.

In one example, the initially mixed composition may have a pH greater than 12, while the cured composition may have a pH of between 7 and 9. Thus, the curable epoxy resin may comprise Cresol Red, which is yellow below a pH about 7.2 and reddish-purple above a pH about 8.8 and the curing agent comprises Methyl Red, which is red below pH about 4.4 and yellow above pH about 6.2. Thus, the first component comprising the curing agent and Methyl Red is yellow in color and the second component comprising the curable epoxy resin and the Cresol Red is a visually different yellow in color. Mixing the two components together yields a mixture that is gray in color. Upon gelling and/or curing the mixture turns pink.

In a particular embodiment, the 2-component epoxy system comprises a halochromic dye, which has at least two color transition ranges and wherein at least one of the first color transition range or the second transition range is between pH of 7-9 when measured in an aqueous solution. Specific examples of such dyes include: Cresol Red, Erichrome Black T, Thymol Blue, and Bromothymol Blue.

Additional examples of compatible dye combinations can be seen in the examples below.

As may be seen in the examples below, the selection of the dye and to which component it is added (epoxy curing agent versus the curable epoxy resin) may result in different colors for the mixing and cure. For example, dye A added to the first component and dye B added to the second component may yield a grey color upon mixing and a pink upon curing, while dye B added to the first component and dye A added to the second component may yield a yellow color upon mixing and not dramatically visually change upon curing.

Dyes

The dyes as disclosed herein are those compounds which are used to color a material by dissolving into solution. Pigments, which impart color on a material are suspended in the material, and include compounds such as carbon black, titanium dioxide, etc. For purposes of the present disclosure, pigments are not encompassed in the term "dye", however, they may be added to the epoxy composition so long as they do not mask the color of the dye.

The dyes that may be used in the present disclosure include those with light absorption or emission in the visible color spectrum (i.e., 400-800 nm) and exhibit a color change by the change in the pH of the composition or by the formation or consumption of a reactive compound within the epoxy resin system composition.

Dyes as known in the art may be useful in the present disclosure, such as azo compounds and triarylmethane compounds. Exemplary dyes include, for example, halochromic dyes and dyes which undergo a color change when combined with reactive compounds within the epoxy resin system composition (e.g., primary amines).

A halochromic dye is a dye which changes color based when the pH changes. The color change typically occurs when a substance binds to existing hydrogen or hydroxide ions in solution which results in changes in the conjugated bond system, which alters the absorbtion of light and results in a visible color change. Halochromic dyes may include those known in the art such as for example, Methyl Red, Cresol Red, Erichrome Black T, Thymol Blue, and Bromothymol Blue.

Dyes that are susceptible to reaction with reactive compounds within the epoxy resin system, include for example those dyes that react with a compound in either the epoxy curing agent or the curable epoxy resin, which results in changes in the conjugated bond system, which alters the absorption of light and results in a visible color change. This interaction may be irreversible or reversible, meaning the dye can be regenerated back to its original color. Such dyes include, for example, cationic triarylmethane dyes, such as Patent Blue V, Violet Blue 6B, and Brilliant Green.

The free base or salt form of the dye may be selected to optimize the solubility of the dye in the composition of interest. In one embodiment, the form of the dye may impact the reaction rate, or the ability of the dye to indicate a color change of the composition upon, for example, mixing, curing, and/or aging. For example, in one embodiment, the dye is in its sodium salt form. In another embodiment, the dye is in its calcium salt form.

The present disclosure is directed to a visible color change in the amine-based epoxy resin system. In an embodiment of the disclosure, a visible color change may be observed between an epoxy curing agent that will adequately cure and one that that has been compromised due to ageing or a packaging flaw such as a crack or broken seal. In another embodiment of the disclosure, a visible color change may be observed between the first component (herein referred to as "the first color"), the second component (herein referred to as "the second color"), the initially mixed composition of the first and second components (herein referred to as "the third color"), and the sufficiently cured mixed composition (herein referred to as "the fourth color"). A visible color change, as referred to herein, means that the colors are sufficiently different and may be readily visible to the naked eye, or optionally a spectrophotomer or colorimeter.

The difference in color may be readily observed with the naked eye by comparing one or more of the colored compositions (which also includes colorless compositions) to a reference standard color (e.g., a printed card or label, etc.) that approximates the color of the components and stages of cure (e.g., not cured versus cured).

The amount of color change exhibited by the dye in a given composition need be only that amount of change that can be accurately measured or recognized by the detection device. It is understood that an instrument such as a spectrophotometer can detect fairly small color changes reproducibly. In contrast, the human eye may not notice or "remember" small color changes, especially when lighting is variable, although the human eye can detect very small color differences when two colors are compared directly (e.g., side by side comparison using a reference standard color).

Preferably, the color change is observable without reference to a side-by-side comparison. That is, the observer can detect and recognize a difference between the colors. For example between a new and an aged sample of epoxy curing agent, or between a mixed and cured epoxy resin system. However, it is also envisioned that a reference standard may be used to facilitate the recognition of a color change. The observer can compare the composition's color with the reference color standard. This allows the observer to detect the color change more easily. The reference standard may be provided, for example, as a separate color "chip" or printed card. This chip or card may be held against the composition of interest for side-by-side comparison.

The color change disclosed herein is directed to a visible color change of the components. Color is made up of three separate attributes: hue, chroma, and lightness. Hue is the perceived object color, e.g., red, yellow, blue, green, etc. Chroma (or saturation) is the vividness of a color, e.g., dull (or grey) to vivid (or saturated). Lightness (or value) is the degree of lightness of a color, e.g., white to black. A color change as referred to herein, is a change in color visible to the naked eye. More preferably, the change in color is related to a change in hue (red to green, blue to yellow, etc.). Although these color changes can be, and are preferably, observed visually with the naked eye, an instrument may be used to more accurately determine the change in color. The color change may be quantitated using CIELAB or CIELCH color spaces. In CIELAB color space L* defines the lightness, a* defines red/green, and b* defines blue/yellow. In one embodiment, the color change observed in L*a*b* color space means ΔE is greater than 1, 2, 3, 5, 6, 8, 10, 20, 30 or even 40, where $\Delta E^*_{ab}$ is equal to the square root of the sum of the change in L* squared plus the change in a* squared plus the change in b* squared. In CIELCH color space L* defines the lightness, C* defines chroma, and h is the hue angle. In one embodiment, a color change in L*C*h color space means ΔH is greater than 1, 2, 3, 5, 6, 8, 10, 20, 30, 40, or even 50, where ΔH is equal to the square root of the difference of the change in E* squared minus the sum of the change in L* squared and the change in C squared. In one embodiment, CMC tolerancing may be used to provide better agreement between the visual assessment and measured color difference. The CMC tolerancing system is a mathematical calculation that defines an ellipsoid around the standard color, which varies in shape to better match color changes that are visual to a human eye. For example, the human eye is more sensitive to changes in chroma than in lightness, which is taken into account in the CMC tolerancing.

The dye in the first and second component should be present in an amount sufficient to provide a visual indication of the change. The amount of dye needed will depend on a number of factors including the natural color of the composition and the desired amount of color change (e.g., less color change may be needed when the detector is more sensitive, more color change may be needed when the color change is poorly visible). In addition, the amount of dye needed will also depend on the dye's tinctorial strength. The dye should have enough tinctorial strength to color the composition effectively and provide for the necessary color change. A common measure of tinctorial strength is the dye's "extinction coefficient." In general, higher extinction coefficient dyes are preferred due to their greater contribution per molecule to color. Lower extinction coefficient dyes, while not preferred, may nevertheless be employed, usually at somewhat higher concentration. For the present disclosure, the amount of dye preferably should be a sufficient amount such that the dye's contribution to the composition's color can be easily observed using the naked eye. The composition may comprise between 0.0001%, 0.001%, 0.005%, 0.01%, 0.05%, 0.1% or even 0.5% to 0.75%, 1.0%, 1.5%, 2.0%, 3.0%, 4.0%, 4.5% or even 5.0% based on the total weight of the composition (e.g., in the case of the shelf-life indicating composition, the total weight is the weight of the epoxy curing agent and in the case of the four color change composition, the total weight is the total weight of epoxy resin system).

Those skilled in the art of dye chemistry will understand that for dyes with a lower molar extinction coefficient correspondingly greater amounts of dye will be required to achieve the same color intensity as a dye with a higher molar extinction coefficient.

In addition, the dye (which may be a liquid or solid) should be soluble in the composition being colored. A "soluble" dye, as used herein, is a dye that when mixed with the initial or uncured composition (including any optional solubilizing agents, e.g., cosolvents or surfactants, that are present in the composition) under the desired conditions of use, dissolves to form a homogeneous colored composition. Such conditions of use include temperature (e.g., over the temperature range encountered during use and cure of the composition), time (e.g., the amount of time the composition is in the uncured state), and concentration (e.g., the concentration of cure-indicating dye in the composition).

The dye-containing composition may optionally comprise one or more suitable cosolvents. The cosolvents may be employed to facilitate the dissolution of the dye and/or other adjuvants in the composition, to facilitate uniform mixing of the reactants, or to adjust the composition's viscosity or flow. Suitable cosolvents for use with the curable epoxy resin and/or the epoxy curing agent include aromatic hydrocarbons, such as xylene and toluene, aliphatic hydrocarbons, such as hexane and mineral spirits, and halogenated hydrocarbons, such as chlorobenzene and trichloroethane. It is desirable that the solvent be transmissive to visible light. In one embodiment, the composition contains less than about 70, 40, or even 10 weight percent cosolvent.

In one embodiment, the dyes are soluble in the composition of interest without the presence of a cosolvent.

Epoxy Curing Agent

Curing agents suitable in the present disclosure are primary or secondary linear or branched long-chain amines, with primary amines being preferred. In one embodiment, the curing agent has a molecular weight of greater than about 150 g/mol, for example between 200 and 700 g/mol. Typically, the curing agent has a molecular weight of less than 3000 g/mol.

Examples of suitable curing agent include those according to the general formula wherein $R^1$, $R^2$ and $R^4$ represent, independently from each other, hydrogen, a linear or branched alkyl or a linear or branched polyoxyalkyl moiety.

The residues $R^1$, $R^2$, $R^4$ may contain a hydrocarbon containing about 1 to 25 carbon atoms or a polyether containing from 3 to 25 carbon atoms. Preferably, one, more preferably two and most preferably all residues $R^1$, $R^2$ and $R^4$ are hydrogen.

$R^3$ represents a linear or branched alkyl, alkylamine, polyaminoalkyl, polyamidoalkyl, alkylether or polyoxyalkyl residue having at least 5 carbon atoms.

Preferably, $R^3$ is a polyether and the curing agent is a polyetheramine or polyetherdiamine including those polyetheramines that can be derived from polypropyleneoxide or polyethylenoxide. $R^3$ may also be a polyamidoamine or a polyamidodiamine including those that can be derived by reacting a dimer or trimer carboxylic acid with a polyetheramine.

Suitable polyetheramines that can be used include but are not limited to those corresponding to the general formula with n being within the range of 1 and 34, such as for example 1, 2, 3, 4, 5, or between 1 and 2 (such as for example 1.5 or 1.7), between 2 and 3 (such as for example 2.5 or 2.7), between 3 and 4 (e.g. 3.5 or 3.7), between 4 and 5 (e.g. 4.5 or 4.7), or n being 31, 32, 33 or between 31 and 33.

Suitable amines are available under the trade designation "PC AMINE DA" from Nitroil, Germany or under the trade designation "JEFFAMINE" from Huntsman, Belgium. A particular preferred curing agent is 4,7,10-trioxamidecane-1,13-diamine (TTD). TTD is commercially available, for example, from BASF or Nitroil.

Combinations of curing agents, for example, a combination of two or more polyetherdiamines are also suitable. In one embodiment, the curing agent comprises at least one curing agent according to formula (II), (III) or (IV).

The one or more curing agents in the curing agent composition may be present in an amount from about 10 to about 50% wt, preferably from about 15 to about 45% wt. In some embodiments, the curing agents may be present in the total composition at greater than their stoichiometric ratio, i.e., the curing agents may be present in a molar ratio of amine active hydrogens to epoxy functionalities of >1.0 (typically from 1.10 to 1.30).

In further embodiments, there are provided compositions that comprise in addition to the curing agent one or more metal salt catalysts for accelerating the curing. Suitable catalysts are those known in the art and include group I metals, group II metals or lanthanoid salts wherein the anion is selected from nitrates, iodides, thiocyanates, triflates, alkoxides, perchlorates, sulfonates, and their hydrates.

For most applications, the catalyst will be used from about 0.05 to less than 15% wt based on the total weight of the epoxy resin system.

Curable Epoxy Resin

The curable epoxy resins useful in the compositions of the present disclosure include those derived from epoxy-functionalized monomers such as monomers containing one or more multifunctional glycidyl ethers.

Typical monomers in curable epoxy resins include: glycidyl ethers of dihydric arenes, aliphatic diols or cycloaliphatic diols. Glycidyl ethers of aliphatic diols include linear or branched polymeric epoxides having one or more terminal epoxy groups such as, e.g., diglycidyl ethers of polyoxyalkylene glycols.

Examples of aromatic glycidyl ethers include, but are not limited to, those that can be prepared by reacting a dihydric arene with an excess of epichlorohydrin. Dihydric arenes, as referred to herein, are arenes having two hydrogen atoms available for a reaction with epichlorhydrin. Examples of useful dihydric arenes include resorcinol, catechol, hydroquinone, and the polynuclear phenols including p,p'-dihydroxydibenzyl, p,p'-dihydroxyphenylsulfone, p,p'-dihydroxybenzophenone, 2,2'-dihydroxyphenyl sulfone, p,p'-dihydroxybenzophenone, 2,2-dihydroxy-1,1-dinaphrhylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylenphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

Preferred examples of epoxy resins include those having one or more repeating units derivable from bisphenol A, bisphenol F or both. Other preferred examples of epoxy resins include those that can be prepared by bisphenol A, bisphenol F or both with epichlorohydrine. The epoxy resins may have a molecular weight in the range of from about 170 to about 10,000, preferably from about 200 to about 3,000 g/mol. The average epoxy functionality in the resin is typically greater than 1 or 2 and less than 4. Novolak-type resins may also be employed.

In some embodiments, the curable epoxy resin may be present in the total composition at greater than their stoichiometric ratio, i.e., the curable epoxy resin may be present in a molar ratio of amine active hydrogens to epoxy functionalities of <1.0 (typically from 1.10 to 1.30).

Examples of commercially available aromatic and aliphatic epoxides useful in the disclosure include diglycidylether of bisphenol A (e.g. available under the trade designation "EPON 828", "EPON 1001", "EPON 1310" and "EPON 1510" from Hexion Specialty Chemicals GmbH, Rosbach, Germany, and "DER-331", "DER-332", and "DER-334" available from Dow Chemical Co,); diglycidyl ether of bisphenol F (e.g. EPICLON 830) available from Dainippon Ink and Chemicals, Inc.); and flame retardant epoxy resins (e.g. "DER 580", a brominated bisphenol type epoxy resin available from Dow Chemical Co.).

Additives

In addition to the dyes, the curing agent component and/or the curable epoxy resin component may comprise fillers such as toughening agents, reactive diluents, rheology controlling agents, adhesion promoters, pigments, flame retardants, antioxidants, and/or UV-protecting agents. The optimum amounts of fillers depend on the amounts and characteristics of the other ingredients present in the curing agent and/or the curable epoxy resin or in the total curable composition. Optimum amounts can be identified through routine experiments for example, by measuring the Brookfield viscosity of the composition, or the characteristics of the cured composition.

Exemplary toughening agents include butadiene-(acrylo) nitrile rubbers (BNR). BNRs are copolymers comprising repeating units derived from 1,2-butadiene and/or 1,3 butadiene and a nitrile-function containing olefin, such as e.g., 2-propenenitrile (acrylonitrile).

Typical BNRs have a Brookfield viscosity (at 27° C.) of greater 80 000 and less than 600 000 Pa·s (Pascal seconds). Preferably the BNRs have a low viscosity (such as a Brookfield viscosity of from about 100 000 to about 300 000 Pa·s at 27° C.). The BNRs may be solid or liquid at ambient conditions. The butadiene acrylonitrile rubber is preferably amine-terminated. Suitable BNRs are commercially available, for example, under the trade designation "HYCAR" from Emerald Performance Materials.

Reactive diluents may be added to control the flow characteristics of the adhesive composition. Preferably, the diluents are part of the curing agent. Suitable diluents can have at least one reactive terminal end portion and, preferably, a saturated or unsaturated cyclic backbone. Preferred reactive terminal ether portions include glycidyl ether. Examples of suitable diluents include the diglycidyl ether of resorcinol, diglycidyl ether of cyclohexane dimethanol, diglycidyl ether of neopentyl glycol, diglycidylether of 1,4 butanediol, diglycidylether of 1,6 hexanediol, triglycidyl ether of trimethylolpropane. Commercially available reactive diluents include, for example, those available under the trade designations "HELOXY MODIFIER 107" from Hexion, The Netherlands, "EPODIL 757" from Air Products, Allentown, Pa., USA, and "EPILOX P13-26" from Leuna Harze, Germany.

The optimum amounts of diluents depend on the amounts and characteristics of the other ingredients present in the curing agent or in the total composition. Optimum amounts can be identified through routine experiments for example, by measuring the Brookfield viscosity of the curing agent.

Typical examples of rheology controlling agents include, but are not limited to, silica-gels, Ca-silicates, phosphates, molybdates, fumed silica, clays such as bentonite or wollastonite, organo-clays, aluminium-trihydrates, hollow-glass-microspheres; hollow-polymeric microspheres and calcium-carbonate. Commercially available rheology controlling agents, include, for example: "SHIELDEX AC5" (Grace Davison, Columbia, Md./USA), a synthetic amorphous silica, calcium hydroxide mixture; CAB-O-SIL TS 720 (Cabot GmbH, Hanau, Germany), hydrophobic fumed silica-treated with polydimethyl-siloxane-polymer; glass-beads class IV (250-300 microns), Micro-billes de verre 180/300 (CVP S.A., France); glass bubbles K37 (3M Deutschland GmbH, Neuss, Germany), MINSIL SF 20 (Minco Inc., 510 Midway, Tenn., USA), amorphous silica; APYRAL 24 ESF (Nabaltec GmbH, Schwandorf, Germany) amorphous, fumed silica; AEROSIL™ R.202 (Degussa, Germany), treated fumed silica.

Examples of flame retardants include, but are not limited to, aluminium trihydrates, or magnesium hydroxides, red phosphorous and ammonium polyphospate. Examples of commercially available products include Portaflame SG40 (Ankerpoort, the Netherlands), aluminium trihydrate, epoxysilane-functionalized (2 wt %) aluminium trihydrate.

Pigments may include inorganic or organic pigments. Typical examples include but are not limited to ferric oxide, brick dust, carbon black, titanium oxide and the like. Pigments may be present so long as the pigment does not mask the color changes of the present disclosure as described herein.

Adhesion promoters for example, silane-containing compounds may or may not be included. An example of a commercially available adhesion promoter includes SILANE Z-6040 (γ-glycidoxypropyl-trimethoxysilane) (DOW-Corning, Seneffe, Belgium).

Application and Mixing

The dyes may be incorporated into the curable epoxy resin and/or the curing agent by intensive stirring or grinding of the components with the dye powder or by mixing the individual components with a solution of the dye. For example with a solution in a solvent incorporated into the components. Suitable solvents include: ketones, such as methyl ethyl ketone, polyethylene glycol, and polycarbonate. Such solutions should be concentrated as much as possible, for example 2 to 20% strength.

The curing agent and the curable epoxy resin compositions may be contained in cartridges and converted into a curable composition for example by extruding the two components simultaneously through a shared nozzle. The precursor composition may be applied at room temperature.

The application of the curing agent and the curable epoxy resin compositions or curable composition to the desired surface can be carried out using, for example, manual applicators or air-powered applicators. Manual and air-powered applicators are available, for example, as EPX manual or EPX air-powered applicators from 3M Company, St. Paul, Minn., USA.

Curing may be carried out a room temperature. Heat may be optionally applied, but application of heat is not necessary.

The mixing of the curable epoxy resin with the curing agent takes place in a known manner. Ratios of the curable epoxy resin to the curing agent may be from 4:1 to 1:4 based on volume or weight, preferably, 2:1, most preferably 1:1. The mixture can be accomplished either manually or mechanically with a whisk or a mixing screw. The user may want to mix the curable epoxy resin with the curing agent so that the mixture can be visual evaluated for completeness of mixing and/or curing.

The curing of the curable epoxy resin with the curing agent occurs by normal means as is known in the art. For example, the compound can be cured at room temperature over a period of from 0.5 to 10 hours, or at elevated temperatures such as between 30 to 170° C. over a period of 5 to 60 minutes.

The addition of the dyes to the 2-component epoxy resin system should not alter the normally employed curing procedures or reaction components.

Items of the Disclosure

Item 1. An epoxy composition comprising: a first component comprising an amine-based curing agent and a first dye, wherein the first component has a first color; and a second component comprising a curable epoxy resin and a second dye, wherein the second component has a second color.

Item 2. The composition according to item 1, wherein the first color and the second color are visually different.

Item 3. The composition according to any one of the proceeding items, wherein the first component and the second component are mixed to form a mixture and wherein the mixture has a third color.

Item 4. The composition according to item 3, wherein the third color is visually different from the first color and the second color.

Item 5. The composition according to item 4, wherein the third color is visually not an additive of the first color and the second color.

Item 6. The composition according to any one of items 3-5, wherein the mixture is cured and the cured mixture has a fourth color.

Item 7. The composition according to item 6, wherein the fourth color is visually different in color from the first color, the second color, and the third color.

Item 8. The composition according to item 7, wherein the difference in color has a ΔH of at least 1 when calculated in L*C*h color space.

Item 9. The composition according to any one of items 7-8, wherein the difference in color has a ΔE of at least 1 when calculated in L*a*b* color space.

Item 10. The composition according to any one of the previous items wherein the first dye is at least one of a triarylmethane compound, an azo compound, and combinations thereof.

Item 11. The composition according to any one of the previous items wherein the second dye is at least one of a triarylmethane compound, an azo compound, and combinations thereof, with the proviso that the first dye and the second dye are not the same.

Item 12. The composition according to any one of the previous items wherein at least one of the first dye and the second dye is a cationic triarylmethane compound.

Item 13. The composition according to item 12, wherein the cationic triarylmethane compound reversibly interacts with a primary amine.

Item 14. The composition according to any one of items 1-11, wherein at least one of the first dye and the second dye is a halochromic dye, which comprises a color transition range from pH 7-9 in an aqueous solution.

Item 15. The composition according to any one of items 1-11, wherein the first dye is Patent Blue V.

Item 16. The composition according to any one of items 1-11, wherein the second dye is Cresol Red.

Item 17. The composition according to any one of items 1-11, wherein the second dye is Erichrome Black T.

Item 18. The composition according to any one of items 1-11, wherein the first dye is Bromothymol Blue.

Item 19. The composition according to any claims 1-11 or claim 15, wherein the second dye is Methyl Red.

Item 20. The composition according to any one of the previous items, wherein the amine-based curing agent is selected from the formula:

$$R^1R^2N-R^3-NR^4H \quad (I)$$

wherein $R^1$, $R^2$ and $R^4$ represent, independently from each other, hydrogen, a linear or branched alkyl or a linear or branched polyoxyalkyl moiety.

Item 21. The composition according to any one of the previous items, wherein the curable epoxy resin comprises the reaction product of bisphenol A with epichlorohydrin.

Item 22. A 2-component epoxy comprising:
a first component comprising an amine-based curing agent and a first halochromic dye, wherein the first halochromic dye has a first color transition range and a second component comprising a curable epoxy resin comprising a second halochromic dye and having a second color transition range.

Item 23. The 2-component epoxy according to item 22, wherein at least one of the first color transition range or the second color transition range is between 7-9 when measured in an aqueous solution.

Item 24. The 2-component epoxy according to any one of items 22-23 wherein at least one of the first halochromic dye and the second halochromic dye is at least one of Cresol Red, Erichrome Black T, Thymol Blue, Bromothymol Blue, and combinations thereof.

Item 25. A shelf-life indicating composition comprising:
an amine-based curing agent; and a dye selected from (i) a cationic triarylmethane dye, wherein the cationic triarylmethane dye reversibly reacts with a primary amine; (ii) a halochromic dye having a color transition range between 7-12 when measured in an aqueous solution; or (iii) combinations thereof.

Item 26. The shelf-life indicating composition according to item 25, wherein the amine-based curing agent is selected from the formula:

$$R^1R^2N-R^3-NR^4H \quad (I)$$

wherein $R^1$, $R^2$ and $R^4$ represent, independently from each other, hydrogen, a linear or branched alkyl or a linear or branched polyoxyalkyl moiety.

Item 27. The shelf-life indicating composition according to any one of items 24-25, wherein the dye is at least one of: Cresol Red, Thymol Blue, Patent Blue V, Erichrome Black T, and combinations thereof.

Item 28. The shelf-life indicating composition according to any one of items 25-27, wherein the composition comprising the amine-based curing agent and the dye has an initial color and upon aging of the amine-based curing agent has a second color.

Item 29. The shelf-life indicating composition according to item 28, wherein the second color and the initial color are visually different in color.

Item 30. The shelf-life indicating composition according to item 29, wherein the difference in color has a ΔH of at least 1 when calculated in L*C*h color space.

Item 31. The shelf-life indicating composition according to item 29, wherein the difference in color has a ΔE of at least 1 when calculated in L*a*b* color space.

Item 32. A method of indicating mixing and curing of a 2-component epoxy composition comprising: mixing a first component comprising an amine-based curing agent and a first dye and having a first color with a second component comprising a curable epoxy resin and a second dye and having a second color to form a third color and allowing the mixture to cure to form a fourth color, wherein each of the first, second, third, and four colors are visually different in color.

Item 33. The method according to item 32, wherein the difference in color has a ΔH of at least 1 when calculated in L*C*h color space.

Item 34. The method according to item 32, wherein the difference in color has a ΔE of at least 1 when calculated in L*a*b* color space.

Item 35. The method according to any one items 32-34, wherein the amine-based curing agent is selected from the formula:

$$R^1R^2N-R^3-NR^4H \quad (I)$$

wherein $R^1$, $R^2$ and $R^4$ represent, independently from each other, hydrogen, a linear or branched alkyl or a linear or branched polyoxyalkyl moiety.

Item 36. The method according to any one of items 31-35, wherein the curable epoxy resin comprises the reaction product of bisphenol A with epichlorohydrin.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent.

TABLE 1

| Materials | |
|---|---|
| Name | Source |
| Curable resin | epoxy resin based on diglycidylether of bisphenol-A, MW <700 grams/mole sold under the trade designation "EPIKOTE 828" from Hexion Specialty Chemicals GmbH, Rosbach, Germany |
| TTD | 4,7,10-Trioxatridecane-1,13-diamine available from BASF, Ludwigshafen, Germany |
| Curable resin 2 | polyamide resin sold under the trade designation "VERSAMID 140" from BASF, Ludwigshafen, Germany |
| Polyether amine | 3,3'-ethylendioxybis(propylamin) sold under the trade designation "JEFFAMINE ED-176" obtained from Huntsman Holland B.V, Rozenburg, The Netherlands |
| Curing agent | 2,4,6-Tri(dimethylaminomethyl) phenol sold under the trade designation "AMCAMINE K54" by Air Products and Chemicals Inc., Allentown, PA. |
| Epoxy toughner | Butadiene based core/shell polymer (37 wt %) dispersed in epoxy resin (diglycidyletherof bisphenol A) sold under the trade designation "KANE ACE MX-257" by KANEKA Belgium N.V., Westerlo-Oevel, Belgium |
| Monomer | Trimethylolpropane triacrylate sold under the trade designation "SR351" by Startomer Co. Inc., Exton, PA. |
| Aluminum hydroxide | Aluminum hydroxide sold under the trade designation "APYRAL 24 ATH" by Nabaltec AG, Schwandorf, Germany. |

TABLE 1-continued

Materials

| Name | Source |
|---|---|
| Acrylic acid | Acrylic acid, glacial, available from BASF, Ludwigshafen, Germany |
| Silica | hydrophobic fumed silica, treated with polydimethyl siloxanes sold under the trade designation "AEROSIL R202" from Evonik Degussa GmbH, Hanau, Germany |
| Silica 2 | fumed silica sold under the trade designation "AEROSIL 200" from Evonik Degussa GmbH, Hanau, Germany |
| Glass beads | Glass beads (200-300 nm) available from CVP SAS, Linselles Cedex, France |
| Dye 1 | Brillant Green, [4-[[4-(diethylamino)phenyl]-phenylmethylidene]cyclohexa-2,5-dien-1-ylidene]-diethylazanium; hydrogen sulfate available from Merck KGaA, Darmstadt, Germany |
| Dye 3 | Bromothymol Blue, 2-bromo-4-[3-(3-bromo-4-hydroxy-2-methyl-5-propan-2-ylphenyl)-1,1-dioxobenzo[c]oxathiol-3-yl]-3-methyl-6-propan-2-ylphenol available from Fluka Chemie AG, Buchs, Switzerland |
| Dye 4 | Eriochrome Black T, sodium (4Z)-4-[(1-hydroxynaphthalen-2-yl)hydrazinylidene]-7-nitro-3-oxonaphthalene-1-sulfonate available from available from Merck KGaA, Darmstadt, Germany |
| Dye 6 | Methyl Violet 6B, [4-[bis(4-dimethylaminophenyl)-methylidene]cyclohexa-2,5-dien-1-ylidene]-dimethylazanium chloride available from Fluka Chemie AG, Buchs, Switzerland |
| Dye 7 | Methyl Orange, sodium 4-(4-dimethylaminophenyl) diazenylbenzenesulfonate available from Fluka Chemie AG, Buchs, Switzerland |
| Dye 8 | Methyl Red, 2-(4-dimethylaminophenyl) diazenylbenzoic acid, sodium salt, available from Merck KGaA, Darmstadt, Germany |
| Dye 9 | Cresol Red, 4-[3-(4-hydroxy-3-methylphenyl)-1,1-dioxo-benzo[c]oxathiol-3-yl]-2-methylphenol available from Fluka Chemie AG, Buchs, Switzerland |
| Dye 10 | Patent Blue V (FBL5), calcium 4-[[4-(diethylamino)phenyl]-(4-diethylazaniumylidenecyclohexa-2,5-dien-1-ylidene)methyl]-6-hydroxybenzene-1,3-disulfonate available from Ciba Specialty Chemicals, Basel, Switzerland |
| Dye 11 | Titan Yellow G, disodium 6-methyl-2-[4-[2-[4-(6-methyl-7-sulfonato-1,3-benzothiazol-2-yl)phenyl]iminohydrazinyl]phenyl]-1,3-benzothiazole-7-sulfonate available from Fluka Chemie AG, Buchs, Switzerland |
| Dye 12 | Thymol Blue, 4-[3-(4-hydroxy-2-methyl-5-propan-2-ylphenyl)-1,1-dioxobenzo[c]oxathiol-3-yl]-5-methyl-2-propan-2-ylphenol available from Fluka Chemie AG, Buchs, Switzerland |
| Dye 13 | Patent Blue V (FBL5), sodium 4-[[4-(diethyl-amino) phenyl]-(4-diethylazaniumylidenecyclohexa-2,5-dien-1-ylidene)methyl]-6-hydroxybenzene-1,3-disulfonate availablefrom Sigma-Aldrich Chemie GmbH, Riedstrasse 2, 89555 Steinheim, Germany |

Preparation of Component A (amine-based curing agent): 20 g of TTD were mixed with 10 wt. % (2.0 g) of silica using a mixer (sold under the trade designation "DAC 150 FV SPEEDMIXER" by Hauschild Engineering, Hamm, Germany) at 3500 rpm for 2 minutes. Subsequently, a dye was added in 5 mg steps until a good visual impression of the color could be obtained. After each addition, the mixture was again mixed using the mixer at 3500 rpm for 1 minute.

Preparation of Component B (epoxy curable resin): 20 g of Curable Resin was mixed with 10 wt. % (2.0 g) of silica using a mixer (sold under the trade designation "DAC 150 FV SPEEDMIXER" by Hauschild Engineering, Hamm, Germany) at 3500 rpm for 2 minutes. Subsequently, a dye was added in 5 mg steps until a good visual impression of the color could be obtained. After each addition, the mixture was again mixed using the mixer at 3500 rpm for 1 minute.

Preparation of Component C: The following: approximately 51 wt % of curable resin 2, approximately 10 wt % polyether amine, approximately 3.4 wt % curing agent, approximately 5 wt % silica 2, approximately 30 wt % aluminum hydroxide, and approximately 1 wt % glass beads were mixed together using a mixer (sold under the trade designation "DAC 150 FV SPEEDMIXER" by Hauschild Engineering, Hamm, Germany) at 3500 rpm for 2 minutes. Subsequently, a dye was added in 5 mg steps until a good visual impression of the color could be obtained. After each addition, the mixture was again mixed using the mixer at 3500 rpm for 1 minute (min).

Preparation of Component D: The following: approximately 31 wt % curable resin, approximately 10.5 wt % epoxy toughner, approximately 26 wt % monomer, approximately 6 wt % silica, approximately 0.2 wt % acrylic acid, approximately 25 wt % aluminium hydroxide, and approximately 1% glass beads were mixed together using a mixer (sold under the trade designation "DAC 150 FV SPEEDMIXER" by Hauschild Engineering, Hamm, Germany) at 3500 rpm for 2 minutes. Subsequently, a dye was added in 5 mg steps until a good visual impression of the color could be obtained. After each addition, the mixture was again mixed using the mixer at 3500 rpm for 1 minute.

Experiments 1-4 (Ex. 1-4) and Comparative Examples A-F (CE A-F)

0.25 grams of Component A were placed on a freshly cleaned (with isopropyl alcohol) glass substrate which was subsequently stored in a sealed glass vessel containing a carbon dioxide-rich atmosphere, to simulate humid ambient air. To create such an environment, 2 drops of concentrated hydrochloric acid was added to 20 grams of solid calcium carbonate. Every hour, an additional 2 drops of acid were added to the carbonate. After 5 hours, the addition was stopped and the samples were allowed to stand over night. Visual assessment of the samples was done initially and periodically throughout the trial. The results are shown in Table 2. Ex. 1 rapidly changed color whereas Ex. 2-4, the color change was more gradual over time.

TABLE 2

| | Dye Used | Initial color | Color after 24 hours |
|---|---|---|---|
| CE A | 1 | Clear, colorless | Clear, colorless |
| CE B | 6 | Clear, colorless | Clear, colorless |
| CE C | 7 | Clear, bright yellow | Clear, bright yellow |
| Ex. 1 | 9 | Clear, orange | Clear, deep purple |
| Ex. 2 | 12 | Clear, light yellow | Clear, light blue |
| CE D | 3 | Clear, blue | Clear, blue |
| Ex. 3 | 4 | Clear, dark blue | Clear, light yellow |
| CE E | 11 | Clear, yellow | Clear, yellow |
| CE F | 8 | Clear, yellow | Clear, yellow |
| Ex. 4 | 10 | Clear, colorless | Clear, blue |

Experiments 5-17 (Ex. 5-17) and Comparative Examples G-AD (CE G-AD)

Components A and B were placed on a white, non-printed playing card in a weight ratio 1 part Component A to 3 parts Component B. The two parts were mixed using a spatula and allowed to stand at ambient conditions for at least 24 hours. Visual assessment of the mixed sample was done initially and again after about 24 hours. Shown in Table 3 are the colors of Components A and B containing each dye. Shown in Table 4 are the results of the mixing and curing of the 2-component epoxy resin.

TABLE 3

| Dye | Component A Color (all samples clear) | Component B Color (all samples opaque) |
|---|---|---|
| 1 | Not tested | Blue green |
| 3 | Bright blue | Bright yellow |
| 4 | Steel Grey | Rose |
| 7 | Not tested | Yellow |
| 8 | Pale yellow | Bright orange |
| 9 | Orange | Light yellow |
| 10 | Colorless | Bright blue |
| 11 | Pale yellow orange | Light yellow |

TABLE 4

| | Component A Dye | Component B Dye | Mixed- Initial color (opaque) | Mixed- Color after 24 hours (opaque) |
|---|---|---|---|---|
| Ex. 5 | 10 | 8 | Yellow | Green |
| Ex. 6 | 10 | 1 | Colorless | Bright blue |
| CE G | 10 | 7 | Yellow | Dark green |
| Ex. 7 | 10 | 9 | Grey | Bright blue |
| CE H | 10 | 4 | Blue violet- slides look different | |
| CE I | 11 | 7 | Yellow | |
| CE J | 11 | 4 | Blue violet | |
| CE K | 11 | 8 | Yellow | |
| Ex. 8 | 11 | 10 | Colorless | Bright blue |
| Ex. 9 | 9 | 1 | Off white | Pink |
| CE L | 9 | 7 | Yellow orange | |
| CE M | 9 | 3 | Blue violet | |
| CE N | 9 | 4 | Blue violet | |
| CE O | 9 | 11 | Yellow orange | |
| CE P | 9 | 8 | Yellow | |
| Ex. 10 | 9 | 10 | Off white | Teal |
| CE Q | 3 | 1 | Faded blue | |
| CE R | 3 | 7 | Yellow green | |
| Ex. 11 | 3 | 9 | Grey | Pink |
| CE S | 3 | 4 | Blue violet | |
| CE T | 3 | 11 | Green | |
| Ex. 12 | 3 | 8 | Yellow green | yellow |
| Ex. 13 | 3 | 10 | Faded blue | Bright blue |
| CE U | 8 | 1 | Yellow | |
| CE V | 8 | 7 | Yellow | |
| Ex. 14 | 8 | 9 | Grey | Pink |
| CE W | 8 | 3 | Blue | |
| CE X | 8 | 4 | Blue violet | |
| CE W | 8 | 11 | Yellow | |
| Ex. 15 | 8 | 10 | Colorless | Teal |
| CE Z | 4 | 1 | Faded violet | |
| CE AA | 4 | 7 | Green | |
| Ex. 16 | 4 | 9 | Grey | pink |
| CE AB | 4 | 3 | Blue | |
| CE AC | 4 | 11 | Green | |
| CE AD | 4 | 8 | Green | |
| Ex. 17 | 4 | 10 | Faded blue | Bright blue |

Example 18

The Preparation of Component C listed above was prepared using 0.25 wt % amount of Dye 10. The Preparation of Component D listed above was prepared using 0.18 wt % of Dye 8.

Example 19

The Preparation of Component C listed above was prepared using 0.25 wt % amount of Dye 13. The Preparation of Component D listed above was prepared using 0.18 wt % of Dye 8.

Example 20

The Preparation of Component C listed above was prepared using 0.25 wt % amount of Dye 10. The Preparation of Component D listed above was prepared using 0.14 wt % of Dye 8.

Example 21

The Preparation of Component C listed above was prepared using 0.25 wt % amount of Dye 13. The Preparation of Component D listed above was prepared using 0.14 wt % of Dye 8.

Figure 1:
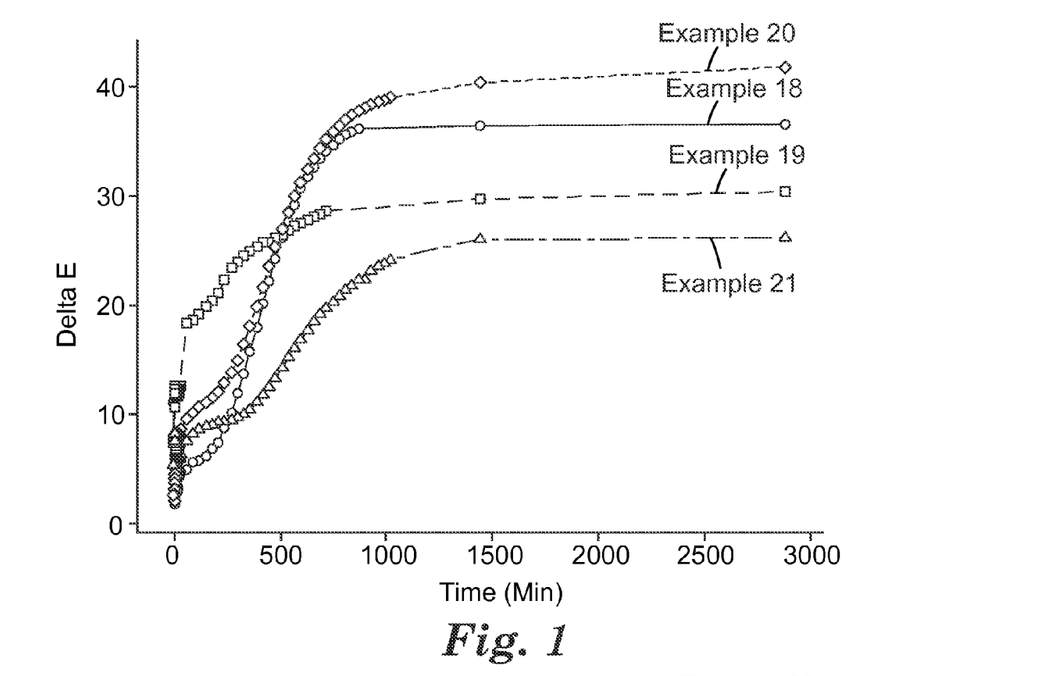
FIG. 1 is a graph showing delta E versus time for Examples 18-21.
Figure 2:
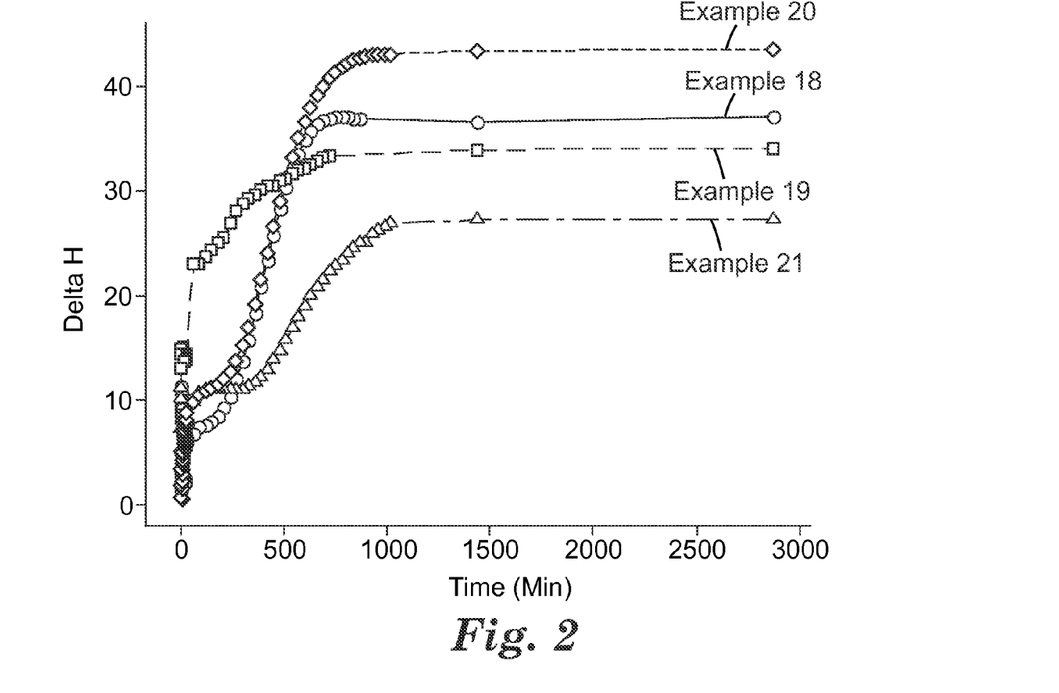
FIG. 2 is a graph showing delta H versus time for Examples 18-21.

For each of the Examples 18-20, 5 g of Component C was weighed into an aluminum dish and 5.5 g of Component D was weighed into a second dish. Component D was then added to Component C and mixed together for approximately 2 minutes. The sample was then immediately spread onto a clear Perspex piece, which was quickly mounted into a sample holder, a white Spectralon standard mounted behind and then measured with a UV-Vis spectrophotometer (sold under the trade designation "VARIAN CARY 500" by Varian Inc., Palo Alton, Calif.). Wavelengths 360 nm to 780 nm at 10 nm intervals were scanned. After taking the initial sample, samples were taken approximately every minute for 30 minutes and then taken every half hour for a minimum of 15 hours. Finally, spectra were taken at 24 hr and 48 hr from the initial reading. ASTM method E308 was used to calculate the color differences in delta E and delta H versus time. The results for delta E ($E^*_{ab}$) are shown in FIG. 1 and for delta H are shown in FIG. 2.

Example 20 was also examined for the four color changes. First, Component C was spread onto a clear Perspex piece, which was quickly mounted into a sample holder, a white Spectralon standard mounted behind, and measured with the UV-Vis spectrophotometer to determine the L*a*b* and L*c*h* values. The same procedure was followed with Component D. Then Component C and D were mixed and immediately tested with the UV-Vis as just described. The mixed sample was then retested after it cured (approximately 48 hours). The results are shown in Table 5 below.

TABLE 5

| | Component D | Component C | After mixing | After cure |
|---|---|---|---|---|
| L* | 74.20 | 48.62 | 59.62 | 40.65 |
| a* | 0.75 | 54.54 | −4.67 | −17.46 |
| b* | 23.00 | 32.22 | 54.90 | 20.77 |
| $C^*_{ab}$ | 23.01 | 63.35 | 55.10 | 27.13 |
| $H^*_{ab}$ | 1.54 | 0.53 | −1.49 | −0.87 |

Example 22

Figure 3:
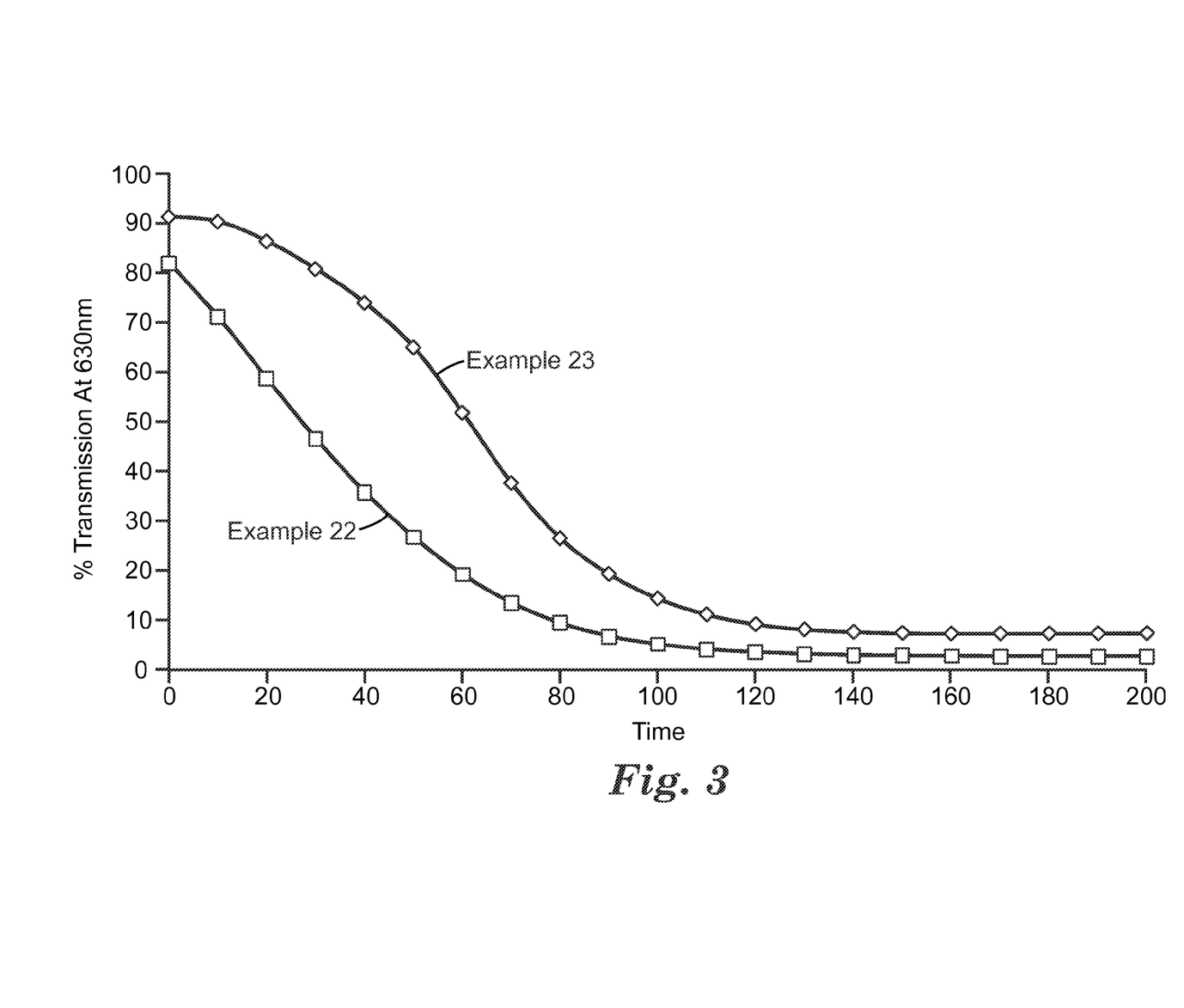
FIG. 3 is a graph of transmission versus time at 630 nm for Examples 22 and 23.

A sample comprising polyether amine with 10 wt % silica and 0.25 wt % of Dye 10 was spread using a paint brush onto a clear Perspex slide. In order to ensure a similar thickness of sample, the edge of a glass slide was used to "smooth out" the layer. The sample was then immediately tested using a Varian Cary 500 UV/Vis Spectrometer in transmission mode. Wavelengths 360 nm to 780 nm at 10 nm intervals were scanned. Spectra were collected every 10 minutes until an endpoint was reached. As the largest change in transmission occurred at 630 nm, the percentage transmission at 630 nm was plotted versus time for each collection. The results are shown in FIG. 3.

Example 23

A sample comprising polyether amine with 10 wt % silica and 0.25 wt % of Dye 13 was sampled and tested as described in Example 22. The results are shown in FIG. 3.

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. An epoxy composition comprising: a first component comprising an amine-based curing agent and a first dye, wherein the first component has a first color; and a second component comprising a curable epoxy resin and a second dye, wherein the second component has a second color, wherein at least one of the first dye or the second dye is selected from (i) a halochromic dye and (ii) a dye that undergoes a color change when combined with primary amines.

2. The composition according to claim 1, wherein the first component and the second component are mixed to form a mixture and wherein the mixture has a third color.

3. The composition according to claim 2, wherein the third color is visually not an additive of the first color and the second color.

4. The composition according to claim 2, wherein the mixture is cured and the cured mixture has a fourth color.

5. The composition according to claim 4, wherein the first color and the second color are visually different, wherein the third color is visually different from the first color and the second color, and wherein the fourth color is visually different in color from the first color, the second color, and the third color.

6. The composition according to claim 5, wherein the difference in color has a ΔH of at least 1 when calculated in L*C*h color space.

7. The composition according to claim 5, wherein the difference in color has a ΔE of at least 1 when calculated in L*a*b* color space.

8. The composition according to claim 1 wherein the first dye is at least one of a triarylmethane compound, an azo compound, and combinations thereof.

9. The composition according to claim 1 wherein the second dye is at least one of a triarylmethane compound, an azo compound, and combinations thereof.

10. The composition according to claim 1 wherein at least one of the first dye and the second dye is a cationic triarylmethane compound.

11. The composition according to claim 1, wherein at least one of the first dye and the second dye is a halochromic dye, which comprises a color transition range from pH 7-9 in an aqueous solution.

12. The composition according to claim 1, wherein the first dye is selected from at least one of: Patent Blue V, and Bromothymol Blue.

13. The composition according to claim 1, wherein the second dye is selected from at least one of: Cresol Red, Erichrome Black T, and Methyl Red.

14. The composition according to claim 1, wherein the amine-based curing agent is selected from the formula:

$$R^1R^2N-R^3-NR^4H \quad (I)$$

wherein $R^1$, $R^2$ and $R^4$ represent, independently from each other, hydrogen, a linear or branched alkyl or a linear or branched polyoxyalkyl moiety and $R^3$ represent a linear or branched alkyl, alkylamine, polyaminoalkyl, polyamidoalkyl, alkylether, or polyoxyalkyl residue having at least 5 carbon atoms.

15. A 2-component epoxy comprising:
a first component comprising an amine-based curing agent and a first halochromic dye, wherein the first halochromic dye has a first color transition range and a second component comprising a curable epoxy resin comprising a second halochromic dye and having a second color transition range.

16. The 2-component epoxy according to claim 15, wherein at least one of the first color transition range or the second color transition range is between 7-9 when measured in an aqueous solution.

17. The 2-component epoxy according to claim 15 wherein at least one of the first halochromic dye and the second halochromic dye is at least one of Cresol Red, Erichrome Black T, Thymol Blue, Bromothymol Blue, and combinations thereof.

* * * * *